(12) United States Patent
Kindl et al.

(10) Patent No.: US 10,060,335 B2
(45) Date of Patent: Aug. 28, 2018

(54) TURBOCHARGER ARRANGEMENT HAVING COMPRESSOR WHEELS ARRANGED IN PARALLEL AND A METHOD FOR OPERATING A TURBOCHARGER ARRANGEMENT

(71) Applicant: Ford Global Technologies, LLC, Dearborn, MI (US)

(72) Inventors: Helmut Matthias Kindl, Aachen (DE); Vanco Smiljanovski, Bedburg (DE); Joerg Kemmerling, Monschau (DE); Franz Arnd Sommerhoff, Aachen (DE); Andreas Kuske, Geulle (NL)

(73) Assignee: Ford Global Technologies, LLC, Dearborn, MI (US)

( * ) Notice: Subject to any disclaimer, the term of this patent is extended or adjusted under 35 U.S.C. 154(b) by 149 days.

(21) Appl. No.: 15/208,473

(22) Filed: Jul. 12, 2016

(65) Prior Publication Data

US 2017/0016385 A1 Jan. 19, 2017

(30) Foreign Application Priority Data

Jul. 13, 2015 (DE) ........................ 10 2015 213 059

(51) Int. Cl.

| F02B 33/44 | (2006.01) |
|---|---|
| F02B 33/00 | (2006.01) |
| F02B 25/06 | (2006.01) |
| F01D 3/02 | (2006.01) |
| F01D 17/00 | (2006.01) |

(Continued)

(52) U.S. Cl.
CPC .............. *F02B 29/02* (2013.01); *F02B 33/40* (2013.01); *F02B 37/007* (2013.01); *F02B 37/12* (2013.01); *F02M 35/10222* (2013.01); *F02M 35/10255* (2013.01); *F04D 17/105* (2013.01); *F04D 27/0207* (2013.01); *F04D 27/0269* (2013.01); *F02B 2037/125* (2013.01); *F05D 2220/40* (2013.01); *F05D 2260/15* (2013.01); *F05D 2260/60* (2013.01); *F05D 2260/606* (2013.01); *Y02T 10/144* (2013.01); *Y02T 10/146* (2013.01)

(58) Field of Classification Search
CPC .... F02B 39/02; F02B 33/40; F02B 2037/125; F02B 37/007; F02B 37/12; F02M 35/10222; F02M 35/10255; F04D 17/105; F04D 27/0207; F04D 27/0269; F05D 2260/606; F05D 2220/40; F05D 2260/15; Y02T 10/144; Y02T 10/146
USPC ...... 60/612, 611; 123/562, 572–574; 415/98, 415/145, 196, 203
IPC ...................................... F02B 37/007
See application file for complete search history.

(56) References Cited

U.S. PATENT DOCUMENTS

| 3,208,213 A * | 9/1965 | Anderson ............. F02B 37/007 60/612 |
| 3,726,605 A * | 4/1973 | Bachl ..................... F01D 5/022 415/203 |

(Continued)

FOREIGN PATENT DOCUMENTS

| CN | 203132207 U | 8/2013 | |
| DE | 10351447 A1 * | 6/2005 | ............ F02B 37/007 |

(Continued)

*Primary Examiner* — Thai Ba Trieu
(74) *Attorney, Agent, or Firm* — Julia Voutyras; McCoy Russell LLP

(57) ABSTRACT

Methods and systems are provided for a turbocharger of an engine. In one example, a method may include balancing a pressure differential between compressor wheels of the turbocharger.

15 Claims, 2 Drawing Sheets

(51) Int. Cl.
*F02B 29/02* (2006.01)
*F02B 33/40* (2006.01)
*F02B 37/12* (2006.01)
*F02M 35/10* (2006.01)
*F02B 37/007* (2006.01)
*F04D 17/10* (2006.01)
*F04D 27/02* (2006.01)

(56) References Cited

U.S. PATENT DOCUMENTS

| | | | | |
|---|---|---|---|---|
| 4,530,639 | A * | 7/1985 | Mowill | F01D 5/043 415/98 |
| 6,378,307 | B1 * | 4/2002 | Fledersbacher | F02B 37/12 60/612 |
| 6,948,314 | B2 * | 9/2005 | Arnold | F02B 37/007 60/612 |
| 7,305,827 | B2 * | 12/2007 | Arnold | F01D 9/026 60/605.1 |
| 7,461,507 | B2 * | 12/2008 | Arnold | F02B 37/007 60/605.1 |
| 8,181,462 | B2 * | 5/2012 | Arnold | F02B 37/007 60/612 |
| 8,322,138 | B2 * | 12/2012 | Jackson | F01M 13/022 123/572 |
| 2015/0050128 | A1 * | 2/2015 | Roques | F02B 37/14 415/145 |
| 2016/0138501 | A1 * | 5/2016 | Keating | F02B 37/007 60/605.1 |

FOREIGN PATENT DOCUMENTS

| | | | | |
|---|---|---|---|---|
| DE | 102005049138 A1 * | 4/2007 | | F02B 37/007 |
| DE | 102012212173 A1 | 5/2014 | | |
| EP | 0177930 A1 * | 4/1986 | | F02B 37/007 |
| JP | 62064828 U * | 4/1987 | | |
| WO | 2011005455 A2 | 1/2011 | | |

* cited by examiner

TURBOCHARGER ARRANGEMENT HAVING COMPRESSOR WHEELS ARRANGED IN PARALLEL AND A METHOD FOR OPERATING A TURBOCHARGER ARRANGEMENT

CROSS REFERENCE TO RELATED APPLICATION

This application claims priority to German Patent Application No. 102015213059.2, filed Jul. 13, 2015, the entire contents of which are hereby incorporated by reference for all purposes.

FIELD

The present disclosure relates to systems and methods for a dual wheel compressor.

BACKGROUND/INTRODUCTION

Turbocharger arrangements are known in many different configurations and are an important part of many drives, especially in the motor vehicle sector. To increase the performance of such turbocharger arrangements, concepts involving a plurality of compressor wheels driven via a shaft by a common turbine are known. Series or parallel flow circuits comprising such compressor stages, depending on the pressure or mass flow requirements, are known.

Particularly parallel circuits comprising compressor stages that discharge air into a common volume tend to be more difficult to control in terms of flow dynamics than turbochargers having just one compressor wheel. This is due to the fact that the two compressor stages generally have different flow properties, and, particularly close to or beyond the surge limit, this leads to the flow conditions first of all becoming unstable at one compressor wheel, something that can lead to an effect on the flow conditions at the other compressor wheel owing to backflows, with the result that this other compressor temporarily operates at a different and possibly likewise unstable operating point. The outcome is that difficult-to-predict oscillating effects arise, these being known as "compressor oscillation" and being incompatible with correct operation of the turbocharger arrangement.

Such compressor oscillation occurs even if there is an attempt to make both compressor stages as similar and symmetrical as possible. The inventors of the present disclosure have recognized the problem underlying this phenomenon to be that, admittedly, the compressor wheel geometry can be made identical and that the outlet duct can also be designed to be symmetrical and substantially similar for both compressor wheels in terms of gas dynamics. However, uniform distribution of the inflowing gas stream between the two compressor wheels is hardly possible in practice since geometrical constraints and installation space considerations lead to different inlet geometries.

Thus, in one possible design of a turbocharger having a multiple compressors, it is envisaged that the common inlet line extends with a substantially circular cross section into a first inlet duct, which branches off in the core region of the cross section and leads over a relatively direct path to the inlet of a compressor wheel, and that a circumferential surface region, in the form of a circular ring, of the cross section of the common inlet duct is routed via a second inlet duct to a second compressor wheel, which lies opposite the first compressor wheel. This second inlet duct is longer and has a plurality of deviations, with the result that this inlet duct has a higher flow resistance. Parallel compressor turbocharger configurations with a bifurcation of the inlet duct are furthermore known. In this case, the supply generally takes place in the axial direction to one compressor wheel and in the radial direction to the other compressor wheel for reasons of installation space. Even if an attempt can be made, by means of the distribution ratio at the branch point of the inlet ducts, to guide equal mass flows into both inlet ducts, this is ultimately hardly possible since the actual distribution ratio is dependent on the actual gas mass flow and on other parameters and therefore varies over the operating range.

Owing to these differing inlet ratios, different inlet pressures are obtained at both compressor wheels. However, since the wheel geometry, i.e. compression properties and outlet pressure—both wheels discharge into the same outlet duct—is/are identical, different operating points (pressure ratios $p_{in}/p_{out}$) in the characteristic curves and hence different stability behavior of the individual compressor wheels may be obtained.

However, the inventors herein have recognized potential issues with such systems. As one example, to avoid the compressor oscillation described above, turbochargers operate in operating ranges close to the surge limit to be left with a relatively large safety margin, and this impairs the efficiency of the turbocharger arrangement overall.

In one example, the issues described above may be addressed by a turbocharger arrangement for an internal combustion engine, having at least two compressor wheels, which run on a common drive axle and discharge air in parallel into a common outlet duct, wherein an inlet duct routed separately in at least one section ahead of the turbocharger arrangement is provided for each compressor wheel, for a flow connection between the inlet ducts to be provided close to the compressor wheels.

The present disclosure relates to a turbocharger arrangement for an internal combustion engine, having at least two compressor wheels, which run on a common drive axle and discharge air in parallel into a common outlet duct, wherein an inlet duct routed separately in at least one section ahead of the turbocharger arrangement is provided for each compressor wheel, in accordance with the preamble of patent claim 1. The present disclosure furthermore relates to a method for operating a turbocharger arrangement of this kind in accordance with the preamble of patent claim 9.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DESCRIPTION

Figure 1:
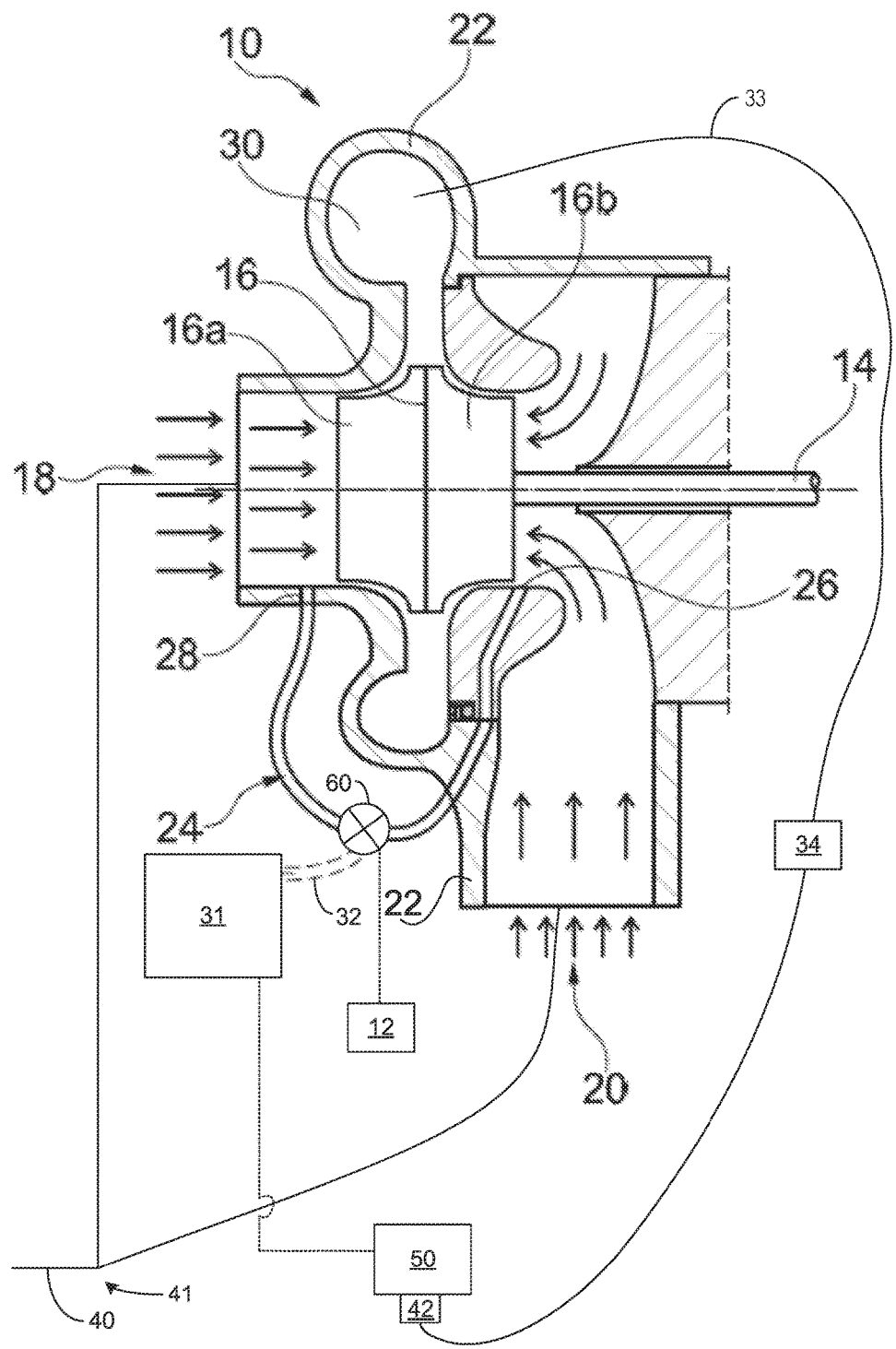
FIG. 1 shows a schematic of an engine having a turbocharger, where the turbocharger comprises a dual-wheel compressor.
Figure 2:
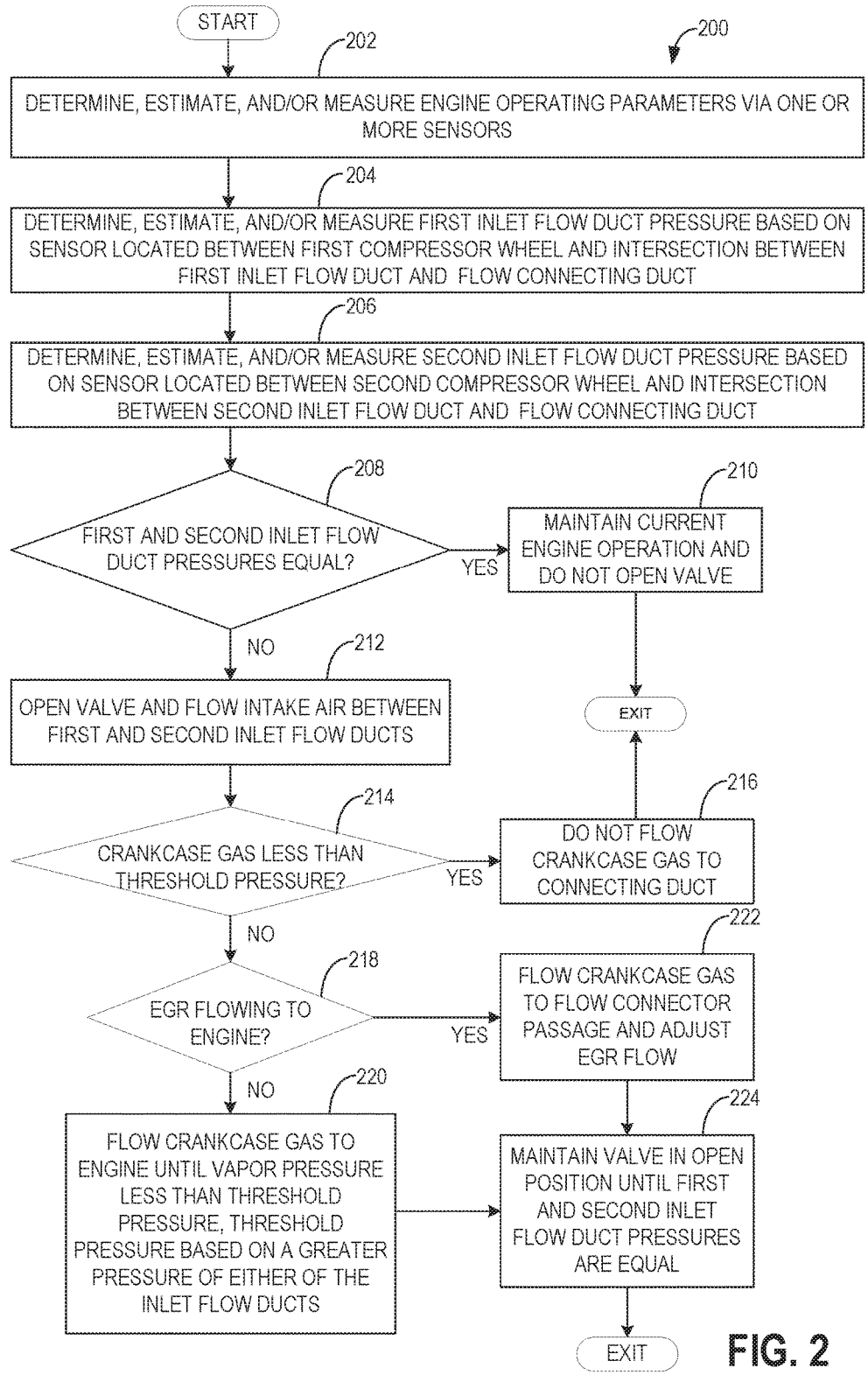
FIG. 2 shows a method for operating a connector duct of the dual-wheel compressor.

The following description relates to a turbocharger having a dual-wheel compressor. The wheels are located on a common drive axle and discharge air into a shared outlet. The wheels are located back to back, where each of the wheels comprises an inlet flow duct. That is, a first wheel of the compressor comprises a first inlet duct and a second wheel of the compressor comprises a second inlet duct. The first and second inlet ducts are formed from a bifurcation of an intake passage upstream of the compressor. To decrease and/or prevent pressure oscillations described above, a connector duct fluidly couples the first and second inlet ducts. The compressor, along with its wheels and ducts are shown in FIG. 1. A method for operating an optional valve of the connector duct in response to operating conditions is shown in FIG. 2.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 1, it shows a turbocharger arrangement 10 in a schematic illustration, which can be used in a motor vehicle having an internal combustion engine 50. The engine 50 may be a spark ignition engine or a diesel (compression ignition) engine.

The turbocharger arrangement 10 has two compressor wheels 16a, 16b (denoted overall by 16) connected fixedly to one another in a back-to-back arrangement, which are seated on a shaft 14 driven in rotation in a known manner by a turbine (situated further to the right of the drawing and not shown), through which exhaust gas flows.

The two compressor wheels 16a, 16b (the blades are not shown specifically) discharge air jointly and radially into an outlet space 30, which is arranged toroidally around the two compressor wheels 16a, 16b and opens into an outlet line 33 leading to an intake manifold 42. That is to say, the outlet space 30 toroidally traverses a largest circumference of the wheels 16a, 16b before connecting with outlet line 33, in one example. A charge air cooler (CAC) 34 is located between the outlet space 30 and the intake manifold 42, where charge air may be cooled and its density increased. In this way, the CAC 34 may allow more charge air to fill a combustion chamber of the engine 50. In some examples, CAC 34 may be omitted. Thus, the compressor wheels 16 are connected in parallel in terms of flow.

The compressed combustion gases enter through two separate inlet ducts 18 and 20. Inlet duct 18 supplies the left-hand compressor wheel 16a in an axial direction, while the right-hand compressor wheel 16b is supplied via a radially extending duct-type feed 20 with appropriate deflection and a distributing volume. Both inlet ducts 18, 20 branch off from intake passage 40 (a corresponding bifurcation is shown at junction 41). The ducts 18, 20 may experience different flow conditions owing to differences in length and different deflections (e.g., geometries), and these flow conditions can lead to imbalance in the turbocharger 10. In one example, these imbalances may lead to compressor oscillation during engine conditions where the compressor 16 approaches a surge limit. The surge limit is defined as a loss of compression due to a disruption of flow to the compressor, which may occur during high loads. Engine adjustments for alleviating surge may include decreasing a power output of the engine (e.g., reduce engine fueling).

Within the scope of the present disclosure, a connection between the two inlet ducts 18, 20 is provided by a connecting line or connecting duct 24, which opens into the inlet ducts 18, 20 adjacent and upstream of the two compressor wheels 16a, 16b at entry points 26, 28. At 28, in the vicinity of the left-hand compressor wheel 16a, the connecting line 24 leaves the lower wall of the inlet duct 18 transversely, extends initially outside a housing 22 of the turbocharger 10 as a line and, in the process, is routed around (e.g., exterior to) the toroidal outlet duct 30. The connecting line 24 is furthermore continued through a bore in the housing 22 of the turbocharger 10 and opens transversely into the associated inlet duct 20, likewise upstream and adjacent to the right-hand compressor wheel 16b. In one example, the entry points 26 and 28 are a threshold distance away from the left- and right-hand compressor wheel 16a and 16b, respectively. The entry points 26 and 28 of the flow connection duct 24 open into the respective inlet ducts 18, 20 in each case at a distance of no more than 100 mm from the respective compressor wheels 16a, b. In one example, the threshold distance may be less than or equal to 50 mm. It will be appreciated that the threshold distance may be other distances without departing from the scope of the present disclosure.

The entry situations and entry spacings with respect to the compressor wheels 16 are approximately the same on both sides to ensure that the pressure compensating effect of the connecting line 24 is optimized. As shown, the connecting line 24 has a smaller cross section than the inlet ducts 18, 20. The connecting line 24 may have a cross-section less than or equal to 20% of the cross-section of either the inlet duct 18 or the inlet duct 20. In one example, the cross-section of the connecting line 24 is exactly 2% of the inlet ducts.

An additional flow connection of this kind, also referred to as a short circuit or bypass, has the effect that unavoidable inlet pressure differences are compensated, with the result that both compressor wheels act at virtually the same operating point. At any event, the deviations are considerably smaller than without an additional flow connection.

At the same time, it is emphasized that this is generally an additional flow connection between the inlet ducts since said ducts are in any case already connected to one another in terms of flow at a branch point provided upstream. However, the connection at a point relatively remote from the compressor wheels may not be suitable in terms of flow dynamics for ensuring similar pressure conditions in the region of the compressor wheels.

Depending on the geometrical shape of the turbocharger arrangement, the flow connection can also be provided by one or more openings in housing parts adjoining both inlet ducts. For example, a connection may be built internally between the housings of the compressors.

In some embodiments, additionally or alternatively, a connecting duct passage may be located in the compressor wheel 16, wherein corresponding openings are provided and are able to account for compressor rotation speeds among other factors. Thus, a packaging restriction of the turbocharge arrangement may be decreased.

As indicated at 32, the connecting line 24 can additionally be used to discharge vapors from a crankcase 31 of the engine 50 into the inlet ducts 18, 20 of the turbocharger 10. As shown, an outlet of the discharge passage 32 corresponds to an optional valve 60 located in the connecting line 24. In this way, crankcase vapors may be discharge upstream of the turbocharger 10. A controller 12 may be electrically coupled to the valve 60, where the controller 12 adjusts operation of the valve 60 based on feedback from various vehicle sensors. Under conditions where the pressures are equal, there may be no flow in the passage and thus the valve may not be needed and/or its position may be either opened or closed. However, under some conditions there may be a pressure differences. In one example, the controller 12 may adjust a position of the valve 60 based on feedback from pressure sensors located in one or more of the inlet ducts 18, 20, and discharge passage 32. In some examples, the valve 60 may be omitted and air may freely flow between the inlet ducts 18, 20 and the discharge passage 32. In another example, the discharge passage 32 may comprise a one-way check valve configured to open only when a pressure of the crankcase 31 overcomes a threshold pressure, where the threshold pressure is based on a pressure of either the first flow inlet duct 18 or the second flow inlet duct 20, whichever is higher. In this way, the crankcase 31 may not receive intake air and may only discharge crankcase vapors when a pressure of the crankcase 31 is greater than a greatest pressure of either of the inlet ducts 18, 20.

In an embodiment of the present disclosure, the flow connection can be designed as a flow duct, which opens into the respective inlet ducts in the immediate vicinity of the compressor wheels. Here, the flow duct may be short to allow rapid and direct pressure compensation.

If the geometrical conditions of the turbocharger arrangement allow, it is also possible for the flow connection to be implemented simply by means of at least one opening, which is introduced into housing parts separating the inlet ducts from one another.

In an embodiment of the present disclosure, the flow connection is implemented in a turbocharger arrangement in which two compressor wheels are provided, which are arranged back-to-back, wherein both compressor wheels have substantially similar delivery characteristics.

With such a turbocharger geometry, the flow duct between the inlet ducts may be routed around an outlet duct extending toroidally around the compressor wheels in order to reach the other side of the turbocharger.

In another embodiment, a crankcase breather duct of the internal combustion engine can additionally open into the flow duct connecting the inlet ducts, with the result that air is discharged from the crankcase into the inlet ducts ahead of the turbocharger. Current exhaust emissions standards stipulate that gases which accumulate in the crankcase of an internal combustion engine, which may contain oil vapor or oil mist, may be subject to post-combustion to ensure that they do not enter the environment or compromise the other exhaust gas aftertreatment devices. In the case of turbocharged engines, recirculation of the crankcase vapors generally takes place ahead of the turbocharger inlet. It is thus possible, by combining the flow connection according to the present disclosure and the crankcase breather system, to reduce the structural outlay for the solution according to the present disclosure.

In one embodiment, it is furthermore possible to provide for the flow duct connecting the inlet ducts to have a cross-sectional area of no more than 20% of the average cross-sectional area of the inlet ducts, and a smaller cross section of 10% or 5% of the average inlet duct cross-sectional area may also still be sufficient. A relatively small cross section for the flow connection is generally sufficient because the pressure differences to be compensated are small and the main benefit of the flow connection is in any case in operating ranges involving relatively low mass flows. Thus, the flow duct can be implemented in a space-saving manner, e.g. by integrating it into housing walls of the turbocharger arrangement.

The flow connection preferably opens into the respective inlet duct in each case at a distance of no more than 100 mm, preferably of no more than 50 mm, from the respective compressor wheels.

Within the scope of the present disclosure, a method for operating a turbocharger arrangement for an internal combustion engine, having at least two compressor wheels, which run on a common drive axle and discharge air in parallel into a common outlet duct, wherein an inlet duct routed separately in at least one section ahead of the turbocharger arrangement is provided for each compressor wheel, is furthermore proposed, in which method inlet pressure differences occurring in the region of the compressor wheels are at least partially compensated by a flow connection.

A method for operating a turbocharger arrangement for an internal combustion engine, having at least two compressor wheels, which run on a common drive axle and discharge air in parallel into a common outlet duct, wherein an inlet duct routed separately in at least one section ahead of the turbocharger arrangement is provided for each compressor wheel, wherein inlet pressure differences occurring in the region of the compressor wheels are at least partially compensated by a flow connection.

Turning now to FIG. 2, it shows a method 200 for operating a valve (e.g., valve XX shown in the embodiment of FIG. 1) located in the flow connection passage (e.g., flow connection passage shown in the embodiment of FIG. 1).

Instructions for carrying out method 200 may be executed by a controller based on instructions stored on a memory of the controller and in conjunction with signals received from sensors of the engine system. The controller may employ engine actuators of the engine system to adjust engine operation, according to the methods described below.

The method 200 may begin at 202, where the method 200 determines, estimates, and/or measures engine operating parameters. Engine operating parameters may include determining an engine load, engine temperature, exhaust mass flow rate, engine speed, crankcase pressure, ram air, and/or air/fuel ratio.

At 204, the method 200 includes determining, estimating, and/or measuring a first inlet flow duct pressure. The first inlet flow duct pressure may be measured by a sensor located between the first wheel and an intersection between the first inlet flow duct and the flow connection passage. In some embodiments, additionally or alternatively, the first inlet flow duct pressure may be estimated based on information in a look-up table. As such, first inlet flow duct pressures may be correlated to engine loads, engine temperatures, etc. Therefore, the method 200 may determine the first inlet flow duct pressure based on a current engine load, in one example.

At 206, the method 200 includes determining, estimating, and/or measuring a second inlet flow duct pressure. The second inlet flow duct pressure may be measured by a sensor located between the second wheel and an intersection between a wall of the second inlet flow duct and the flow connection passage. In one example, the sensor used to measure the first inlet flow duct pressure may also be used to measure the second inlet flow duct pressure. In some embodiments, the first and second inlet duct pressures may be estimated based on one or more of the engine operating parameters described above. Similar to the first inlet flow duct pressure, the second inlet flow duct pressure may also be determined based on information stored in a look-up table.

At 208, the method 200 determines if the first and second inlet flow duct pressures are unequal. In one example, the pressures may be equal if a mass air flow in both the first and second inlet flow ducts is substantially equal.

If the first and second inlet flow duct pressures are substantially equal, then the method 200 proceeds to 210 to maintain current engine operating parameters and to not open the valve in the flow connection passage. In this way, the first inlet flow duct remains fluidly sealed from the second inlet flow duct.

If the first and second inlet flow duct pressures are unequal, then the method 200 proceeds to 212 to fluidly couple the first and second inlet flow ducts by actuating the valve of the flow connection passage to an open position. By doing this, air may flow from a higher pressure inlet flow duct to a lower pressure inlet flow duct to equilibrate the first and second inlet flow duct pressures to decrease and/or prevent pressure oscillations. As an example, if the first inlet flow duct pressure is greater than the second inlet flow duct pressure, then uncompressed intake air flows from the first inlet flow duct, through the flow connection passage with the valve in an at least partially open position, and into the second inlet flow duct. In one example, air may flow through the flow connection passage until the first and second inlet flow duct pressure are substantially equal. Substantially equal may be defined as the pressures being within 5% or less of one another, in one example.

At 214, the method 200 includes determining if a crankcase vapor pressure is less than a threshold pressure. In one example, the threshold pressure may be based on a pressure of one or more of the first and second inlet duct pressures (e.g., inlet ducts 18 and 20). In this way, the crankcase vapor may flow into the connection duct when the vapor pressure of the crankcase vapors is greater than the pressure of both the inlet ducts. In some examples, the threshold pressure may be based on a spring of a one-way check valve located in the crankcase breather duct.

If the crankcase vapor pressure is less than the threshold pressure, then the method 200 proceeds to 216 and does not flow crankcase gas to the connecting duct. In this way, a valve between the connecting duct and the breather duct does not open and gas does not flow from the crankcase to the connecting duct.

If the crankcase vapor pressure is greater than the threshold pressure, then the method 200 proceeds to 218 and determines if EGR is flowing to the engine. If EGR is not flowing to the engine, then the method 200 proceeds to 220 to flow crankcase vapors to the connecting duct.

If EGR is flowing to the engine, then the method 200 proceeds to 222 to adjust EGR flow and flow crankcase vapors to the connecting duct. Adjusting the EGR flow may include adjusting the EGR flow to compensate for added fuel vapors flowing from the crankcase to the engine. In one example, the EGR is decreased in response to the crankcase vapors flowing to the engine. By doing this, a combination of EGR and crankcase vapors may meet an engine EGR demand. In this way, the method 200 may decrease and/or prevent a likelihood of knock and/or combustion instability as a result of over-dilution.

Method 200 proceeds to 224, following 220 or 222, to maintain the valve in the connecting duct in the open position until the first and second inlet flow duct pressures are substantially equal. This decreases pressure oscillations which may occur during operation of both the first and second compressors.

In this way, a turbocharger of an engine comprising back-to-back compressor wheels operating in parallel may reduce and/or prevent pressure oscillations experienced by the compressor wheels. Despite different inlet duct geometries, pressure oscillations experienced by the compressor wheels may be reduced by fluidly coupling the inlet ducts of the compressor wheels via a connecting duct. Outlets of the connecting duct are located proximally to the compressor wheels. The connecting duct may flow air from one of the inlet ducts to a second of the inlet ducts in response to a pressure differential between the inlet ducts. The technical effect of flowing intake air between the inlet ducts in response to a pressure differential is to balance a pressure of the inlet ducts and decrease pressure oscillations.

A turbocharger arrangement comprising an internal combustion engine, having at least two compressor wheels, which run on a common drive axle and discharge air in parallel into a common outlet duct, wherein an inlet duct routed separately in at least one section ahead of the turbocharger arrangement is provided for each compressor wheel, wherein a flow connecting duct between the inlet ducts is provided close to the compressor wheels. A first example of the turbocharger arrangement further includes where the flow connecting duct opens into the respective inlet ducts in adjacent to the compressor wheels. A second example of the turbocharger arrangement, optionally including the first example, further includes where the flow connecting duct is implemented by means of at least one opening, which is introduced into housing parts separating the inlet ducts from one another. A third example of the turbocharger arrangement, optionally including the first and/or second examples, further includes where two compressor wheels are provided, which are arranged back-to-back, wherein both compressor wheels have substantially similar delivery characteristics. A fourth example of the turbocharger arrangement, optionally including one or more of the first through third examples, further includes where the flow duct between the inlet ducts is routed around an outlet duct extending toroidally around the compressor wheels. A fifth example of the turbocharger arrangement, optionally including one or more of the first through fourth examples, further includes where a crankcase breather duct of the internal combustion engine additionally opens into the flow duct connecting the inlet ducts, with the result that air is discharged from the crankcase into the inlet ducts ahead of the turbocharger arrangement. A sixth example of the turbocharger arrangement, optionally including one or more of the first through fifth examples, further includes where the flow duct connecting the inlet ducts has a cross-sectional area of no more than 20% of the average cross-sectional area of the inlet ducts. A seventh example of the turbocharger arrangement, optionally including one or more of the first through sixth examples, further includes where the flow connection opens into the respective inlet duct in each case at a distance of no more than 100 mm from the respective compressor wheels.

A method comprising operating a turbocharger arrangement for an internal combustion engine, having at least two compressor wheels, which run on a common drive axle and discharge air in parallel into a common outlet duct, wherein inlet ducts are routed separately in at least one section ahead of the turbocharger arrangement is provided for each compressor wheel and inlet pressure differences occurring in the region of the compressor wheels are at least partially compensated by a flow connecting duct. A first example of the method further including where the flow connecting duct at least partially compensates for the inlet pressure differences by actuating a valve located in the flow connection duct to a more open position. A second example of the method, optionally including the first example, further including where the flow connecting duct fluidly couples a first inlet and a second inlet of the inlet ducts, where the first inlet corresponds to a first compressor wheel of the compressor wheels, and the second inlet corresponds to a second compressor wheel of the compressor wheels. A third example of the method, optionally including the first and/or second examples, further including where the first inlet duct extends in an axial direction and the second inlet duct extends in a radial direction, and where the flow connecting duct comprises outlets corresponding to the first and second inlet ducts located within 100 millimeters of the first compressor wheel and the second compressor wheel, respectively. A fourth example of the method, optionally including one or more of the first through third examples, further including where compensating the inlet pressure differences further includes flowing air between the inlet ducts via the flow connecting duct.

A system comprising a turbocharged engine having two compressor wheels arranged back-to-back along a common shaft, and where inlet ducts of the compressor wheels comprise different geometries and a flow connecting duct fluidly coupling the inlet of the compressor wheels downstream of a bifurcation of an intake passage, where a cross-section of the flow connecting duct is less than a cross-section of the inlet ducts. A first example of the system further includes where the cross-section of the flow connecting duct is 10% of the cross-section of the inlet ducts. A second example of the system, optionally including the first example, further includes where the compressor wheels comprise a shared outlet, and where the outlet is toroidal and wraps around a largest circumference of the compressor wheels. A third example of the system, optionally including the first and/or second examples, further includes where the flow connecting duct is routed exterior to the outlet with respective ends of the flow connecting duct being physically coupled to each of the inlet ducts. A fourth examples of the system, optionally including the first, second, and/or third examples, further includes where the flow connecting duct is hollow and comprises outlets for fluidly coupled the inlet ducts, and where a first outlet of the flow connecting duct is within 100 millimeters of a first wheel and a second outlet of the flow connecting duct is within 100 millimeters of a second wheel.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a turbocharged engine having two compressor wheels arranged back-to-back along a common shaft,
where inlet ducts of the two compressor wheels comprise different geometries; and
a flow connecting duct fluidly coupling the inlet ducts of the two compressor wheels downstream of a bifurcation of an intake passage;
wherein a cross-section of the flow connecting duct is less than 20% of an average cross-section of the inlet ducts.

2. The system of claim 1, wherein the cross-section of the flow connecting duct is 10% of the average cross-section of the inlet ducts.

3. The system of claim 1, wherein the two compressor wheels comprise a shared outlet, and where the shared outlet is toroidal and wraps around a largest circumference of the two compressor wheels.

4. The system of claim 3, wherein the flow connecting duct is routed exterior to the shared outlet with respective ends of the flow connecting duct being physically coupled to each of the inlet ducts.

5. The system of claim 1, wherein the flow connecting duct is hollow and comprises outlets for fluidly coupling the inlet ducts, and where a first outlet of the flow connecting duct is within 100 millimeters of a first compressor wheel and a second outlet of the flow connecting duct is within 100 millimeters of a second compressor wheel.

6. A turbocharged internal combustion engine, comprising:
   a turbocharger having at least two compressor wheels, which run on a common drive axle and discharge air in parallel into a common outlet duct,
   wherein an inlet duct routed separately in at least one section ahead of the turbocharger is provided for each of the at least two compressor wheels,
   wherein a flow connecting duct is provided between the inlet ducts, and
   wherein the flow connecting duct is implemented by at least one opening, which is introduced into housing parts separating the inlet ducts from one another.

7. The turbocharged internal combustion engine of claim 6, wherein the flow connecting duct opens into the respective inlet ducts within a threshold distance from the at least two compressor wheels.

8. The turbocharged internal combustion engine of claim 6, wherein two compressor wheels are provided, which are arranged back-to-back.

9. The turbocharged internal combustion engine of claim 8, wherein the flow connecting duct between the inlet ducts is routed around the common outlet duct extending toroidally around the at least two compressor wheels.

10. The turbocharged internal combustion engine of claim 9, wherein a crankcase breather duct of the turbocharged internal combustion engine additionally opens into the flow connecting duct connecting the inlet ducts, with a result that crankcase vapors are discharged from a crankcase into the inlet ducts ahead of the turbocharger during operating conditions of the internal combustion engine when a pressure of the crankcase increases above a threshold pressure, the threshold pressure based on a greater pressure of either of the inlet ducts.

11. The turbocharged internal combustion engine of claim 6, wherein the flow connecting duct between the inlet ducts has a cross-sectional area of no more than 20% of an average cross-sectional area of the inlet ducts.

12. The turbocharged internal combustion engine of claim 6, wherein the flow connecting duct opens into the respective inlet duct in each case at a distance of no more than 100 mm from the at least two compressor wheels, respectively.

13. A method of operating a turbocharger in an internal combustion engine, comprising:
   determining one or more engine operating parameters via one or more sensors;
   during engine operation,
      determining a first inlet flow duct pressure via an engine controller based on an indication from a first sensor located between a first compressor wheel of the turbocharger and an intersection between a first inlet flow duct and a flow connecting duct;
      determining a second inlet flow duct pressure via the engine controller based on an indication from a second sensor located between a second compressor wheel of the turbocharger and an intersection between a second inlet flow duct and the flow connecting duct; and
      partially compensating an inlet pressure difference between the first inlet flow duct pressure and the second inlet flow duct pressure by actuating a valve of the flow connecting duct to an open position via the engine controller;
   wherein the first and second compressor wheels of the turbocharger run on a common drive axle and discharge air in parallel into a common outlet duct,
   wherein the first and the second inlet flow ducts are routed separately in at least one section ahead of the turbocharger provided for each of the first and second compressor wheels; and
   wherein the flow connecting duct fluidly couples a first inlet and a second inlet of the first and second inlet ducts, where the first inlet corresponds to the first compressor wheel and the second inlet corresponds to the second compressor wheel.

14. The method of claim 13, further comprising flowing crankcase vapors into the flow connecting duct during engine operating conditions when a pressure of the crankcase is above a threshold pressure, the threshold pressure based on a greater pressure of either of the first inlet flow duct pressure or the second inlet flow duct pressure, wherein the first inlet flow duct extends in an axial direction and the second inlet flow duct extends in a radial direction, and where the flow connecting duct comprises outlets corresponding to the first and second inlet flow ducts located within 100 millimeters of the first compressor wheel and the second compressor wheel, respectively.

15. The method of claim 13, further comprising maintaining the valve positioned in the flow connecting duct in the open position to obtain the first inlet flow duct pressure being equal to the second inlet flow duct pressure via the controller.

* * * * *